United States Patent
Bojar

[11] Patent Number: 5,285,855
[45] Date of Patent: Feb. 15, 1994

[54] ADJUSTABLE PITCH GARDEN HOE TOOL

[76] Inventor: James A. Bojar, 2524 Pasadena Blvd., Wauwatosa, Wis. 53226

[21] Appl. No.: 16,252

[22] Filed: Feb. 11, 1993

[51] Int. Cl.⁵ ............................ A01B 1/06; A01B 1/22
[52] U.S. Cl. .................................. 172/377; 172/372; 294/53.5
[58] Field of Search ............ 172/371, 372-374, 172/376, 377, 380, 381, 734, 739, 745, 705, 707; 294/53.5; 81/177.2; 403/83, 84, 106, 108

[56] References Cited

U.S. PATENT DOCUMENTS

| | | | |
|---|---|---|---|
| 386,197 | 7/1888 | Hain | 172/376 |
| 568,143 | 9/1896 | Parcells | 172/376 |
| 824,862 | 7/1906 | Hilton | 172/375 |
| 1,144,374 | 6/1915 | Bastian | 172/372 |
| 1,210,100 | 12/1916 | Pottorf | 172/372 |
| 1,334,586 | 3/1920 | Baker | 172/376 |
| 1,591,280 | 7/1926 | Carr . | |
| 1,627,901 | 5/1927 | Hills | 172/376 |
| 1,823,438 | 9/1931 | Craig | 172/372 |
| 1,870,891 | 8/1932 | Bristow | 172/376 |
| 1,895,055 | 1/1933 | Steinour . | |
| 1,940,169 | 12/1933 | Hinton | 306/15 |
| 2,419,719 | 4/1947 | Kennedy | 172/372 |
| 2,741,969 | 4/1956 | Streaker | 172/372 |

FOREIGN PATENT DOCUMENTS 0606411 11/1934 Fed. Rep. of Germany .

*Primary Examiner*—Randolph A. Reese
*Assistant Examiner*—Spencer K. Warnick
*Attorney, Agent, or Firm*—Robert T. Johnson

[57] ABSTRACT

Disclosure is made of a garden hoe tool, having an adjustable pitch head, to control the depth of the dig into the soil, and the head comprising a tool base blade and vertical sides on the base blade and a compression V spring to lock the pitch of the head, as adjusted.

3 Claims, 2 Drawing Sheets

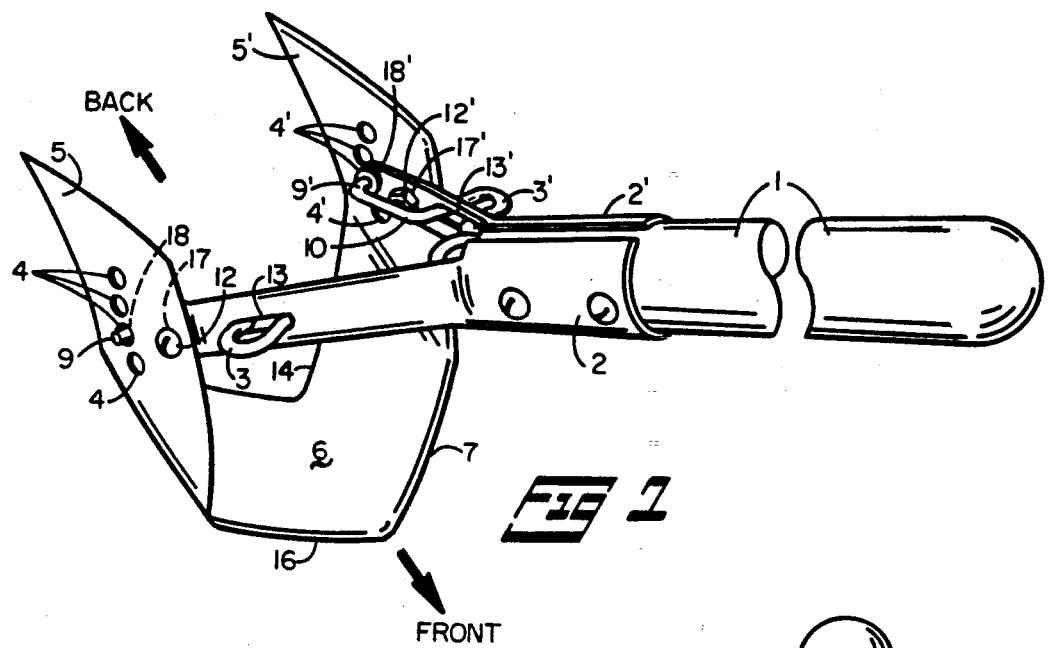
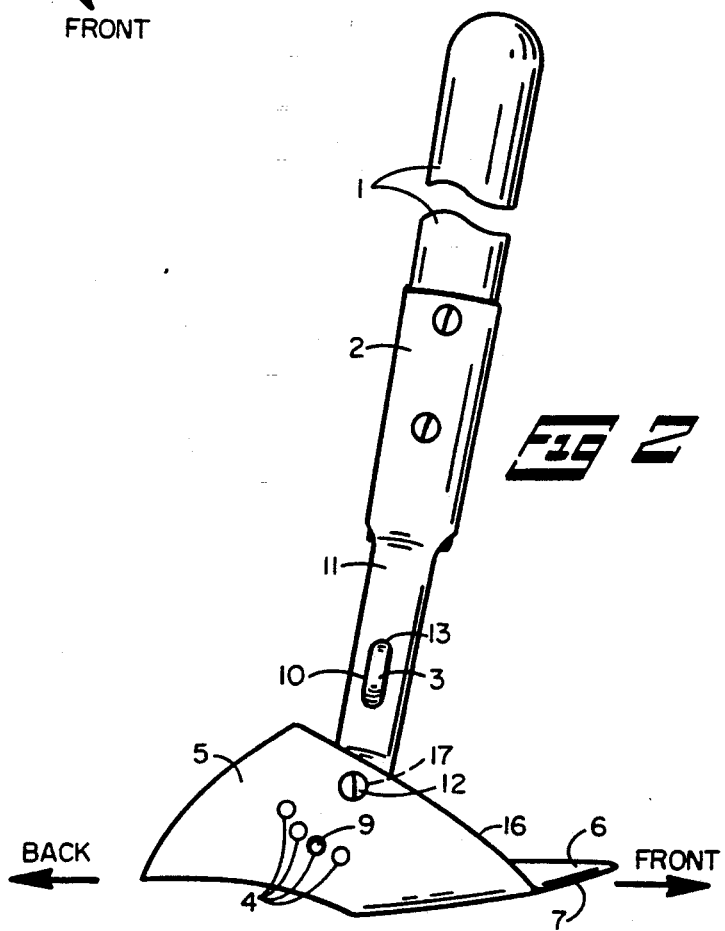

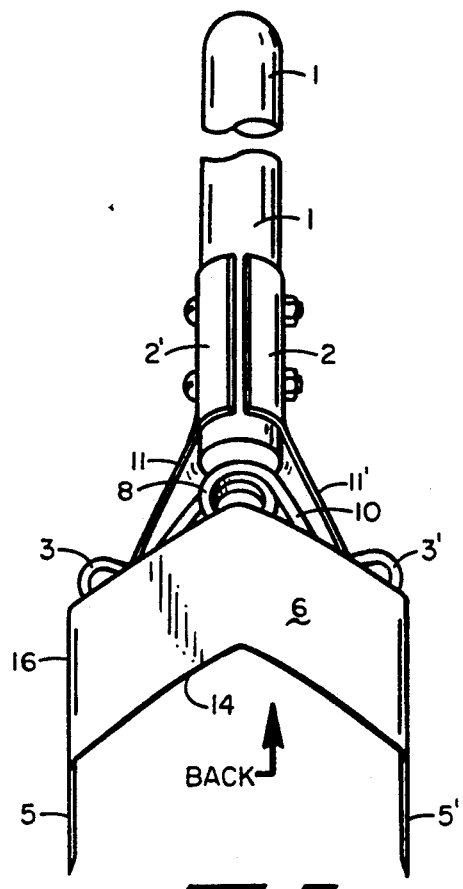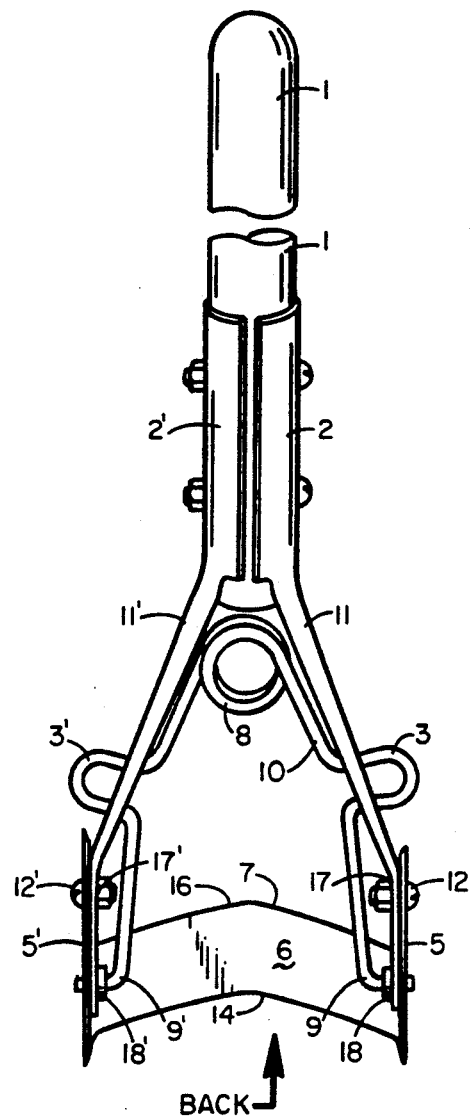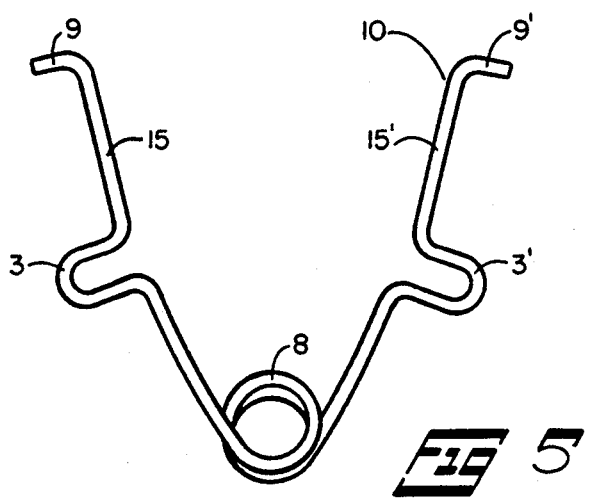

ADJUSTABLE PITCH GARDEN HOE TOOL

This invention relates to a garden hoe tool having an adjustable pitch head the purpose of which is to control the depth of the dig into garden soil.

BACKGROUND OF THE INVENTION

This invention relates to a manufacture, as an adjustable pitch garden hoe, wherein the pitch of head assembly can be adjusted to control the dig or bite into the soil. To date the usual garden hoe has a fixed head that is not adjustable thus the dig or bite into the soil cannot be easily controlled.

Prior art citations are:

U.S. Pat. No. 386,197 for: HOE. Disclosure is made in this patent of a hoe blade comprising a wedge shaped horizontal blade.

U.S. Pat. No. 568,143 for: SHUFFLE HOE. Disclosure ade of a cutting blade and side wings.

U.S. Pat. No. 824,862 for: HOE. Disclosure is made of a hoe designed as a mulching tool.

U.S. Pat. No. 1,334,586 for: GARDEN WEEDER. In this patent disclosure is made, to have an adjustable head to adjust the position of the blade.

U.S. Pat. No. 1,591,280 for: HANDLE FASTENING FOR HOES. Disclosure is made of a scuffle hoe with an adjustable handle.

U.S. Pat. No. 1,627,901 for: BARK PEELER. Disclosure is made of adjustable blade section.

U.S. Pat. No. 1,870,891 for: LAWN AND GARDEN IMPLEMENT. Disclosure is made of a tool for gardening lawn edging etc.

Other patents for the record are; U.S. Pat. No. 1,895,055, U.S. Pat. No. 1,940,169, German pat. No. 606411.

It is an object of this invention to disclose, as a manufacture, an adjustable pitch garden hoe tool having a handle with ferrule legs attached thereto and a hoe tool head attached to the ferrule legs by means of a pivot bolt and a v spring with elbows extending through slots in the ferrule legs and arms of the V spring legs extending through holes in the ferrule legs and into pitch set holes in vertical sides of hoe tool head.

SUMMARY OF INVENTION

This invention provides, as a manufacture, an adjustable pitch garden hoe having a head with a modified hoe blade base and vertical sides on the hoe blade base and a modified compression V spring and elbows on the legs of the V spring, with the elbows extending through slots in the ferrule legs and arms of the V spring legs extending into pitch set holes in the vertical sides of the base blade.

BRIEF DESCRIPTION OF DRAWINGS

FIG. 1—Perspective view of ADJUSTABLE PITCH GARDEN HOE TOOL.
FIG. 2—Elevation view of left side.
FIG. 3—Upward plan view.
FIG. 4—Downward plan view.
FIG. 5—Compression V spring.

LEGENDS OF DRAWINGS

1—Handle
2, 2'—Ferrule mount segments.
3, 3'—Elbows of modified V spring.
4, 4'—pitch set holes.
5, 5'—Vertical sides of base blade.
6—Garden hoe tool base blade.
7—Front edge of garden hoe tool base blade.
8—Spring coil base of V spring.
9, 9'—Arms of v spring legs.
10—Compression V spring.
11, 11'—Ferrule legs.
12, 12'—Fastening pivot bolts.
13, 13'—Slots in ferrule legs.
14—Back edge of garden hoe tool base blade.
15, 15'—Legs of v spring.
16—Hoe tool head
17, 17'—Bolt holes in ferrule legs.
18, 18'—Holes in ferrule legs for arms of Y spring legs.

DETAILED DESCRIPTION OF INVENTION

The description which follows discloses, as a manufacture an adjustable pitch garden hoe tool of a handle 1, to which is attached ferrule mount segments 2, 2' and ferrule legs 11, 11' attached to the mount segments 2, 2'. The adjustable pitch segment of this garden hoe tool head 16 is an assembly of a base blade 6, and two vertical sides 5, of base blade. The base blade 6, and vertical sides 5, 5' is a unitary or single unit garden hoe tool head 16 and 5' is adjustable for the variable pitch of base blade 6. The vertical sides 5, 5' attached to base blade 6 are mounted on the ends of ferrule legs 11, 11' by means of bolts 12, 12' extending through matching holes in the ferrule legs 11, 11' and vertical sides 5, 5'. The bolts 12, 12' act as the pivot point in adjusting the pitch of the hoe tool.

To lock the adjusted pitch of the hoe tool head 16, a modified compression V spring 10, having elbows 3, 3' fitting into slots 13, 13' in ferrule legs 11, 11', and arms 9, 9' of V spring legs 15, 15' fitting into holes 18, 18' in the end of ferrule legs 11, 11' and the arms 9, 9' extending aligned variable pitch set holes 4, 4' as desired.

The V spring 10 is mounted between ferrule legs 11, 11' with elbows 3, 3' extending through slots 13, 13' in the ferrule legs 11, 11' and the arms 9, 9' extending through holes as described above, to lock the pitch as adjusted.

The V spring 10, shape preferred has a spring coil base 8, and this spring is mounted with the apex , or spring coil base 8 at the apex of the ferrule legs 11, 11', and on being so mounted the spring 10 is held in position by the elbows 3, 3' and arms 9, 9' mounted as described above.

The hoe tool head 16, is formed of hoe blade base 6, and vertical sides 5, 5' The hoe blade base 6 is of a modified V shape, with the protruding apex in the front, (see FIGS. 1 & 2), and the concave apex in the back.

The elbows 3, 3' of V spring 10 extend outward further than arms 9, 9' of V spring legs 15, 15' such that on squeezing inward the V spring elbows 3, 3' when mounted in slots 13, 13' in ferrule legs 11, 11' the arms 9, 9' are withdrawn or forced out of aligned holes 4, 4' of vertical sides 5, 5' of base blade of hoe tool head 16 thus allow for changing the pitch of the hoe tool head 16, as it pivots on the fastening pivot bolts 12, 12'.

Referring now to FIG. 5, the V spring 10 has elbows 3, 3' and arms 9, 9' extending outward and the apex of the V spring is a spring coil base 8 of approximately one revolution for better spring action as desired.

The compression V spring 10, has on each leg 15, 15' an elbow 3, 3' respectively, extending outward at a midpoint between the apex 8 and the end of each leg 15, 15', and at the end of each leg 15, 15' of the v spring, an arm 9, 9' extending outward. When v spring is mentioned this means compression V spring.

To make for easy use of the above described apparatus, the edges of the vertical sides 5, 5' and the front edge 7 and back edge 14 of the garden hoe tool head 16 are sharpened to a desired cutting edge.

Having described my invention, I claim:

1. An adjustable pitch garden hoe tool wherein the improvement comprises;
   a—a handle;
   b—ferrule mount segments attached to said handle so as to form an apex;
   c—ferrule legs attached to said ferrule mount segment;
   d—a garden hoe tool head having a base blade and vertical sides;
   e—said garden hoe tool head attached to said ferrule legs by fastening pivot bolts extending through said ferrule legs and said vertical sides of said base blade;
   f—a compression V spring mounted between said ferrule legs, and the apex of said V spring mounted in the apex of said ferrule legs;
   g—elbows of said V spring extending through slots in said ferrule legs; and
   h—said V spring having a pair of legs, each said V spring leg having an arm extending outward and through a hole in said ferrule leg and extending through an aligned hole in said vertical side of said base blade.

2. An adjustable pitch garden hoe tool, as in claim 1, wherein:
   a—each leg has an outwardly extending elbow between the apex of said V spring and the end of each said leg of said V spring; and
   b—each said arm extends outwardly at the end of each said leg of said V spring.

3. An adjustable pitch garden hoe took, as in claim 1, wherein:
   a—the vertical sides, a front edge and a back edge of said adjustable pitch garden hoe tool head are sharpened to a cutting edge.

* * * * *